United States Patent
Noble et al.

(10) Patent No.: US 8,947,005 B2
(45) Date of Patent: Feb. 3, 2015

(54) PROGRAMMABLE LIGHTING DEVICE

(75) Inventors: Barry Angus Noble, Devon (GB); Fergus McPherson Noble, Devon (GB)

(73) Assignee: Nite Ize, Inc., Boulder, CO (US)

( * ) Notice: Subject to any disclaimer, the term of this patent is extended or adjusted under 35 U.S.C. 154(b) by 1011 days.

(21) Appl. No.: 12/102,402

(22) Filed: Apr. 14, 2008

(65) Prior Publication Data

US 2008/0272714 A1 Nov. 6, 2008

Related U.S. Application Data

(63) Continuation-in-part of application No. PCT/GB2006/003558, filed on Sep. 25, 2006.

(30) Foreign Application Priority Data

Oct. 14, 2005 (GB) .................................. 0520975.4

(51) Int. Cl.
*H05B 39/00* (2006.01)
*G05F 1/00* (2006.01)
*F21V 23/04* (2006.01)
(Continued)

(52) U.S. Cl.
CPC ............. *F21V 23/0414* (2013.01); *F21L 4/027* (2013.01); *F21S 10/00* (2013.01); *G06F 8/61* (2013.01); *H05B 33/0803* (2013.01);
(Continued)

(58) Field of Classification Search
CPC ......... H05B 33/02; H05B 37/02; H05B 41/02
USPC ................... 315/291, 307, 200 A, 209 R, 292
See application file for complete search history.

(56) References Cited

U.S. PATENT DOCUMENTS 5,381,074 A * 1/1995 Rudzewicz et al. ............. 315/77
6,138,241 A * 10/2000 Eckel et al. .................... 713/300
(Continued)

FOREIGN PATENT DOCUMENTS

WO    WO 0022890 A2    4/2000

OTHER PUBLICATIONS

Schneiker H: "LED Flishlight White Paper" Internet Citation [Online] Sep. 17, 2004, XP007901435 Retrieved from the Internet: URL:http://www.hdssystems.com/LedFlashlightWhitePaper.pdf> [retrieved on Dec. 8, 2006] p. 9, paragraph 2-p. 10, paragraph 2.
(Continued)

*Primary Examiner* — Minh D A
(74) *Attorney, Agent, or Firm* — Squire Patton Boggs (US) LLP

(57) ABSTRACT

A flashlight (1) having a control unit (4) with a push button (12) for activating the flashlight (1). The control unit (4) connects to a computer via USB port, whereby user-configurable control information is downloaded. A computer program running on the computer enables operating conditions of the flashlight to be selected by a user according to predetermined types of activation e.g. of the push button (12). The operating conditions are collated into operating instructions associated with the predetermined types of activation. The operating instructions are converted into byte code and downloaded to and stored on a memory in the control unit (4). Upon detecting a predetermined activation type, the control unit accesses the operating conditions and configures the flashlight accordingly.

24 Claims, 7 Drawing Sheets

(51) Int. Cl.
*F21L 4/02* (2006.01)
*F21S 10/00* (2006.01)
*G06F 9/445* (2006.01)
*H05B 33/08* (2006.01)
*F21Y 101/02* (2006.01)

(52) U.S. Cl.
CPC ........ H05B 33/0842 (2013.01); *F21V 23/0407* (2013.01); *F21Y 2101/02* (2013.01)
USPC ...................................... 315/200 A; 315/292

(56) References Cited

U.S. PATENT DOCUMENTS

| | | |
|---|---|---|
| 6,140,934 A | 10/2000 | Lam |
| 6,265,984 B1 | 7/2001 | Molinaroli |
| 6,578,982 B1 | 6/2003 | Lynch |
| 6,717,376 B2 * | 4/2004 | Lys et al. ...................... 315/292 |
| 7,173,516 B2 * | 2/2007 | Mullet et al. .................. 340/5.71 |
| 7,332,877 B2 * | 2/2008 | Crodian et al. ................ 315/297 |
| 2002/0158583 A1 * | 10/2002 | Lys et al. ......................... 315/82 |
| 2003/0085621 A1 * | 5/2003 | Potega ............................ 307/18 |
| 2004/0119587 A1 * | 6/2004 | Davenport et al. ........... 340/538 |
| 2004/0145890 A1 * | 7/2004 | Liao ............................. 362/183 |
| 2004/0264542 A1 * | 12/2004 | Kienitz ......................... 374/120 |
| 2005/0122710 A1 | 6/2005 | Kim |
| 2005/0134188 A1 * | 6/2005 | Lindqvist ...................... 315/149 |
| 2005/0174473 A1 * | 8/2005 | Morgan et al. ................ 348/370 |
| 2005/0176400 A1 * | 8/2005 | Mullet et al. .................. 455/403 |
| 2008/0272714 A1 | 11/2008 | Noble et al. |

OTHER PUBLICATIONS

In the US Patent and Trademark Office U.S. Appl. No. 13/346,692 Non-Final Office Action dated Sep. 13, 2013, 17 pages.
ASP, "Triad USB" Brochure 2011.
Online Search Result, "Triad USB," Oct. 2007.

* cited by examiner

PROGRAMMABLE LIGHTING DEVICE

This non-provisional application is a continuation of and claims the benefit of International Application No. PCT/GB2006/003558, filed Sep. 25, 2006, which claims priority to United Kingdom Application No. 0520975.4, filed Oct. 14, 2005. The disclosures of the prior applications are hereby incorporated herein in their entirety by reference.

FIELD OF THE INVENTION

This invention relates to lighting devices which are programmable to produce variable light output. In particular, it relates to devices where light output is selectable by a user. For example, it is applicable to hand held torches with user-adjustable light output levels.

BACKGROUND TO THE INVENTION

The development and increased commercial use of LEDs in all kinds of lighting device has led to a desire to be able to control the power level and hence the brightness at which the devices operate. One reason for this is that modern LEDs can be exceptionally bright when run at full power. Such brightness may not be suitable for the task or mood for which the lighting device is needed, so it is useful to be able to select a more suitable brightness when required. Furthermore, when running at full power, LEDs can use substantial amounts of energy. Reducing the operating brightness also reduces the power consumption. This is especially useful when the lighting device battery-powered, as using reduced power can extend the life of the battery.

Hand held torches are a particular example of a lighting device where brightness control is used. One reason for this is the wide variety of situations or conditions in which one may use a torch. A known torch of this type is the EDC Ultimate Flashlight manufactured by HDS Systems, Inc. This flashlight permits the user to select the brightness of four levels which can be accessed quickly during use. The brightness of each level is selected from one of 19 or 20 preset (non-adjustable) levels. The user can also select from a number of preset flashing modes if they are desired instead of a steady beam. In this example, selection and setting is achieved by manipulating the flashlight's operating button. The flashlight is arranged to distinguish between short 'clicks' and longer 'presses' of the button, and the user is able to access and change the optional features described above by entering different sequences of clicks and/or presses. However, the limited vocabulary of sequences and their complexity makes the options on the flashlight difficult and time-consuming to set.

SUMMARY OF THE INVENTION

The present invention may ameliorate the problems associated with known programmable lighting devices by providing a more user-friendly programming procedure. The invention may provide more programming functionality, i.e. to increase the programming options and control available to the user.

At its most general, the present invention provides a lighting device programming system arranged to permit a user to program one or more operating configurations of a lighting device externally of the device, and to download the programmed operating configuration on to the lighting device, where they are then selectable by the user.

Programming the lighting device's configuration externally, i.e. remotely from the lighting device itself, gives greater flexibility and control to the user. One benefit may be the provision of greater control over the lighting device, i.e. the user may be able to set more features of the lighting device than was possible with previous devices.

Thus, in a first aspect, the present invention may provide a lighting system having: a lighting device for providing light, the lighting device having a light source, a power supply for providing electric current to the light source, and a control unit for controlling operation of the lighting device, and a programming device remote from the lighting device and communicable with the control unit, the programming device having a computer program loaded thereon that is arranged: to receive commands from a user; to create one or more operation instructions on the basis of the received commands; and to communicate the created operation instruction(s) to the control unit; wherein the control unit has a memory for storing the communicated operation instruction(s) and activation means for causing the control unit to execute a stored operation instruction, each operation instruction being arranged to configure one or more operating conditions for the lighting device. Thus, a user may be able to set a value for one or more operating conditions of the lighting device in the programming device. The computer program on the programming device is preferably arranged to collate the set value or values into an operating instruction for downloading on to the control unit memory.

The lighting device is preferably portable, e.g. a torch or table lamp. It may be a fixed installation, e.g. room lighting. The programming device may be any device with suitable processing power, but is preferably a computer, e.g. PC or laptop. Preferably, the programming device includes a recognised user input device, e.g. keyboard or mouse, to enable the user to set the operating conditions easily.

The communication between the control unit and programming device may have any form. In one arrangement, the control unit and programming device have USB ports, and are linked by a wired connection. Other types of wired connection are possible, as is wireless communication, e.g. using infra-red technology. The control unit and processing device may only be communicable during downloading. They may be separate isolated entities at other times. In this case, when the lighting device is e.g. a pocket torch (flashlight), it only needs to be communicable to the device during programming; after the operating instruction(s) are set, the lighting device may be used remotely from and out of contact with the device.

In a second aspect of the invention, there may be provided a lighting device having: a light source; a power supply for providing electric current to the light source; and a control unit for controlling operating of the light device, the control unit being communicable with an external device in order to receive one or more operation instructions from the external device, wherein the control unit is arranged to store the received operation instruction(s) and to execute a stored operation instruction upon receipt of a user command, each operation instruction being arranged to configure operating conditions for the lighting device. The lighting device may be portable, e.g. a flashlight or the like.

Whilst the light source may include any type of light emitting means, e.g. filament or halogen bulbs, one or more light emitting diodes (LEDs) are preferred. LEDs generally produce less heat during use than other light sources of equivalent brightness. A plurality of LEDs of the same or different colour may be used. A group of red, green and blue LEDs may be used to provide a range of output colours. For example, the relative brightness of these LEDs may be variable to provide output colour selectivity. The light source also preferably includes a reflector element e.g. to focus the emitted light from the LED(s) or other light emitter into a beam. The light source may be a replaceable module, e.g. to allow a user to select light emitter type or reflector element size. Larger diameter reflector elements give more powerful light beams. Modular reflector units also allow reflectors with different beam characteristics to be included in the lighting device. Preferably, each reflector module allows the reflector to move along the axis of the device. This allows the light from the emitter to be focused, or to have its beam coherence varied.

Preferably, the electronics for controlling operation of the device are installed separately from the light source module, e.g. in the control unit. This arrangement makes the construction of the light source simpler and may reduce the cost of manufacture.

Preferably, the control unit includes electronic circuitry for operating the device. The control unit preferably includes a communication interface for receiving the operating instructions from the external processing device. As explained above, the communication interface may be of any convenient type, wired or wireless. In the embodiment described below, a USB port and associated circuitry is provided. The communication interface may also be arranged to send information to the external processing device, e.g. about the status of the lighting device.

The control unit also preferably has processing means or firmware or the like installed therein, arranged to configure operation of the lighting device on the basis of operating instructions received from the external processing device. The control unit preferably has a memory for storing a plurality of operation instructions. The firmware is preferably arranged to select one or more of the operating instructions to configure the lighting device on the basis of commands received from the user. Preferably, the control unit includes activation means, e.g. one or more push buttons, switches or the like, to enable the user to send commands to the control unit, i.e. commands that may be recognised and acted on by the firmware.

Preferably, the control unit is contained in a housing, e.g. a modular housing that comprises part of a body housing the lighting device. The outer surface of the control unit housing is preferably part of the outer surface of the lighting device body. Preferably, the activation means is provided at the outer surface for easy access by the user during use.

Preferably the body of the device, and/or the control unit housing includes a mounting connection for securely mounting the lighting device, e.g. to keep the light source at a fixed location. The mounting connection may include a tripod bush e.g. when the lighting device is a flashlight, to enable the flashlight to be mounted stably on a tripod during use. Alternatively, the mounting connection may be used to fix the lighting device to a wall or ceiling fitting, e.g. when the lighting device is used as interior e.g. domestic lighting. The mounting connection may include a dovetail groove.

The control unit itself may be a third aspect of the present invention, expressed as a control unit for controlling a light source in a lighting device, the control unit having: a communications interface for receiving one or more operation instructions from an external (remote) processing device; a memory for storing the received operation instruction(s); input means for receiving commands from a user; and processing means for executing a stored operation instruction upon receipt of a user command, wherein each operation instruction is arranged to configure operating conditions for the lighting device. The control unit preferably includes embedded software arranged to interpret the operation instruction(s) and, based on the interpreted operation instruction, to configure components of the lighting device. The configuration step is explained in further detail below.

The power supply for the lighting device may be any convenient means of providing electric current for powering the light emitter. Preferably, the power supply is arrange to supply DC current. For example, the power source may include a AC/DC converter, or may comprise a battery. Preferably, the power supply is portable, e.g. it may be contained in a modular housing. A modular system may also allow different types or size of battery to be connected to the control unit or light source. The battery housing may be sized to fit different batteries. For example, a short battery housing may fit one battery to achieve compact size, whereas an alternative housing may fit two or more batteries to increase the working life of the device.

Preferably, the power supply is arranged to deliver a set current output over a range of input voltages. The output current is a measure of the brightness of the light emitter. Thus, the operation instruction may be arranged to set the current level provided to the light source, and the power supply is therefore preferably able to deliver that set current, whatever the voltage value of the connected power supply.

Preferably, the circuitry of the lighting device is arranged to operate within a working voltage of 1.6 or 1.8 to 24 V or more. This allows the device to be powered from a diverse range of power supplies including many types of battery, both rechargeable and non-rechargeable, the external device via a wired e.g. USB connection, and a car battery e.g. via a car adapter similar to those used for mobile telephones.

The lighting device may include one or more operating buttons in addition to the activation means on the control device. These additional operating button(s) may function independently of the control unit, but their operations are preferable configurable by the control unit and are therefore preferably programmable by the user at the external device. In the flashlight embodiment, the additional operating button(s) preferably include a tail switch located on the end of the flashlight body opposite the light source. The tail switch may perform a different function from the activation means on the control unit, which itself may be a simple switch. The tail switch may be a push button switch; the control unit may be able to distinguish between short and long presses on the switch. The distinction between short and long presses, e.g. the length of time the switch must be depressed to count as a long press may be configure by the control unit e.g. on the basis of an operation instruction. Thus, this distinction may be programmed by a user on the external device.

Alternatively or additionally, the tail switch can provide more sophisticated modes of operation than simple on/off behaviour. Preferably, the tail switch is arranged to send a signal to the control unit so that the control unit can respond by adjusting the device's output according to a customisable operating instruction, as described below. One way to achieve this is to wire the tail switch directly into the control unit. However, arranging for the tail switch to be wired in this way can make the engineering of the connections between the tail switch, control unit and power supply difficult. Preferably, the tail switch is therefore arranged to momentarily disconnect the power supply when actuated. The disconnection can be detected by the control unit. Thus, a sequence wherein the power supply is initially connected then disconnected and reconnected within a set time period may be seen by the control unit as a tail switch 'on' actuation. A second similar sequence may be recognised as a tail switch 'off' actuation. Alternatively, the tail switch may perform a latching operation, where a disconnect-reconnect cycle occurs once for a complete 'on' and 'off' actuation cycle (e.g. push and release) of the tail switch.

In a development of this idea, the device may include other switches that are arranged to mimic the tail switch behaviour. The device may have several such switches operating together so that any of them can trigger the tail switch behaviour. For example, in a flashlight configuration, one might want to have a regular push button operating in tandem with a remote 'tape' switch, commonly used on existing weapon mounted flashlights.

The control unit may store a flag which represents an operating instruction that indicates how the device should react to a tail switch actuation. This flag is checked upon power up of the device and if the flag is clear the device continues normal operation, but if the flag is set then the device performs the behaviour for a tail switch actuation. This flag may be initially cleared, but before the device resumes normal operation, the flag is set so that a subsequent tail switch actuation will trigger the set behaviour. The flag may be cleared before the tail button behaviour is performed. The flag may be stored in memory whereby it state is preserved during power down.

In a most preferred embodiment, the tail switch push button has a locking facility to present accidental operation of the device. For example, the button may be twisted into a state that prevents pressing.

The additional operating button(s) may be provided on a separate module, so the user may choose the type or number of buttons on his device.

The modular nature of the lighting device may be a fourth aspect of the invention. Thus, there may be provided a kit for constructing a lighting device, the kit including a plurality of modules interconnectable to form the lighting device, wherein the plurality of modules include:

one or more interchangeable light source modules;

one or more interchangeable power supply modules for providing electric current to the light source module; and one or more interchangeable control unit module for controlling operation of the light source, each control unit module being communicable with an external device in order to receive one or more operation instructions from the external device, the control unit being arranged to store the received operation instruction(s) and to execute a stored operation upon receipt of a user command, each operation instruction being arranged to configure operating conditions for the light source, wherein the assembled lighting device includes at least one of a light source module, power supply module and a control unit module.

Preferably, the kit includes one or more interchangeable switch modules, each having one or more operating buttons thereon, whose function are preferably controlled by the control unit. The modular system may thus enable the creation of lighting devices according to customer requirements. One advantage may be that each control unit module may be usable in a wide range of lighting devices, whose purposes are different. The control unit may be versatile enough to be programmed in a way that is consistent with those purposes.

Turning now to the configuration of the lighting device, as mentioned above, the control unit is arranged to access and interpret a stored operation instruction upon receipt of a command from the user in order to set one or more control parameters of the lighting device. A wide variety of configurable parameters may be provided. Alternatively, the operation instruction may be arranged to set only one or two parameters. In this case, certain characteristics of the lighting device will be preset and non-adjustable. Preferably, however, each operation instruction is arranged to configure the complete set up of the lighting device.

Thus, in use, a user selects values for the parameters that are configurable by an operation instruction on the programming device. The programming device preferably includes software to convert the user-selected values into an operating instruction that can then be downloaded onto the control unit of the lighting device.

Thus, in a fifth aspect of the invention, there is provided a computer program product comprising a computer program for loading on a processing device that is communicable with a lighting device, the computer program being arranged to cause the processing device: to receive commands from a user of the processing device; to create one or more operation instructions on the basis of the received commands; and to communicate the created operated instruction(s) to the lighting device, wherein each operation instruction is arranged to configure operating conditions (e.g. parameter values, etc) for the lighting device. The operating conditions of the lighting device may therefore be set by the user by operating the computer program on the processing (programming) device.

The operating conditions that may be set by the user can include one or more or all of the following properties of the lighting device.

The brightness of the light source may be set by the value of one or more parameters in the operating instruction. The brightness is typically related to the electric current provided to the light source; the operating instruction may include a value representative of this current. The user may simply choose a value for the brightness e.g. from a list of numbers ranging from low (for low brightness) to high (for high brightness). For example, the user may be able to select any number between 0 and 127. Alternatively, the user may be able to select a value representing the percentage of maximum brightness required. For example, the user would select 100% if maximum brightness was desired, or 50% if half brightness was required.

The operating instruction may configure the lighting device so that a sequence of differing configurations is provided. A sequence preferably includes two or more basic configuration blocks, each configuration block containing value for one or more parameters used to configure the lighting device. Thus, an operating instruction may configure the lighting device to produce two or more consecutive output blocks, each having e.g. a different brightness level. Preferably, the duration of each output block is selectable by the user, and defined in the operation instruction.

The operation instruction may include a fade block arranged to gradually increase or decrease the brightness level between the different output blocks defined above. The duration of the fade block may also be selectable by the user. Thus, the rate of brightness change may be user-selectable.

The user may be able to program the lighting device to flash on and off, e.g. by programming output blocks with zero brightness level in between output blocks with visible brightness levels. Since the duration of the output blocks may be user-selectable, the length of pause between flashes as well as the length of the flashes themselves can be user-selectable.

The computer program may also provide a strobe option, e.g. a configuration block for configuring the lighting device to produce a series of rapid flashes having the same brightness level. Preferably, the computer program is arranged to allow the user to select the repeat rate of the strobe as well as the duration and brightness level of the strobe configuration block.

The computer program may also be arranged to implement a repeat loop in the operation instruction. In other words, the operation instruction may be arranged to repeat a series of one or more consecutive configuration blocks (e.g. output blocks, fade blocks or strobe blocks etc). Thus, a user may create a sequence of blocks and then cause those blocks to be repeated by programming a repeat loop into the operation instruction. Preferably, the number of repeats effected by the repeat loop may be selectable by the user on the computer program.

In a development of the strobe block, the computer program may be arranged to configure a block that outputs a message as a series of flashes in Morse code. The user may be able to select or program the message to be output. For example, the computer program may include a sub-program for translating typed text into Morse code in dots and dashes (i.e. short and long flashes of the light source in this case). Such translating sub-programs are already known. The Morse code block may be added as part of a sequence of other configuration blocks, and may be included in a repeat loop.

Preferably, the computer program is also arranged to configure other options available to the user when operating the lighting device. For example, the computer program may be arranged to set the functions of the operating switches (activation means, tail switch etc) on the lighting device. As an example, in one embodiment the operation instruction may be arranged to cause the lighting device to toggle to a specific constant brightness when the tail switch is pressed. This brightness level may be selectable by the user in the computer program. The operation instruction may be further arranged to cause the lighting device to return to whatever it was previously doing when the tail switch is pressed again. This means that the user can toggle between a particular e.g. complicated sequence of output blocks and a constant brightness.

The computer program may also allow the user to customise the gamma correction curve of the lighting device. This may be achieved by loading a table of gamma correction values e.g. directly from a file on the programming device, into the operation instruction. Alternatively, the control unit may be arranged to set the gamma correction to a power law relationship (the usual standard for gamma correction), but with an index that is selectable by the user. Thus, the user may be select a value for the index in the computer program, which may then generate a table of values corresponding to the power law. The table of values may then be downloaded on the control unit to be used for gamma correction.

Preferably, the computer program product provides a graphical user interface on the programming device, to provide a visual implementation of the operation instruction and programming procedure. Preferably, the block sequences referred to above can be constructed graphically, e.g. by 'dragging and dropping' icons representing the different types of available block and separately selecting parameters associated with those icons. Alternatively or additionally, these sequences may be programmable directly in code.

After the sequences have been selected by a user of the computer program, the computer program is arranged to create an operation instruction out of the selected value. Preferably, the operation instruction contains a table of values representing parameters set by firmware in the control unit, together with a portion of byte code representing the sequence or sequences defined by the user. Thus, the computer program is arranged to compile the user sequences directly into byte code for the control unit. By compiling the byte code for downloading the operation instruction into the control unit, the amount of memory space required in the control unit can be saved. Furthermore, because the control unit reads the sequences in byte code, the running speed of the device is increased.

BRIEF DESCRIPTION OF THE DRAWINGS

An example of the present invention will now be described in detail with reference to the accompanying drawings in which.

DETAILED DESCRIPTION

Further Options and Preferences

Figure 1:
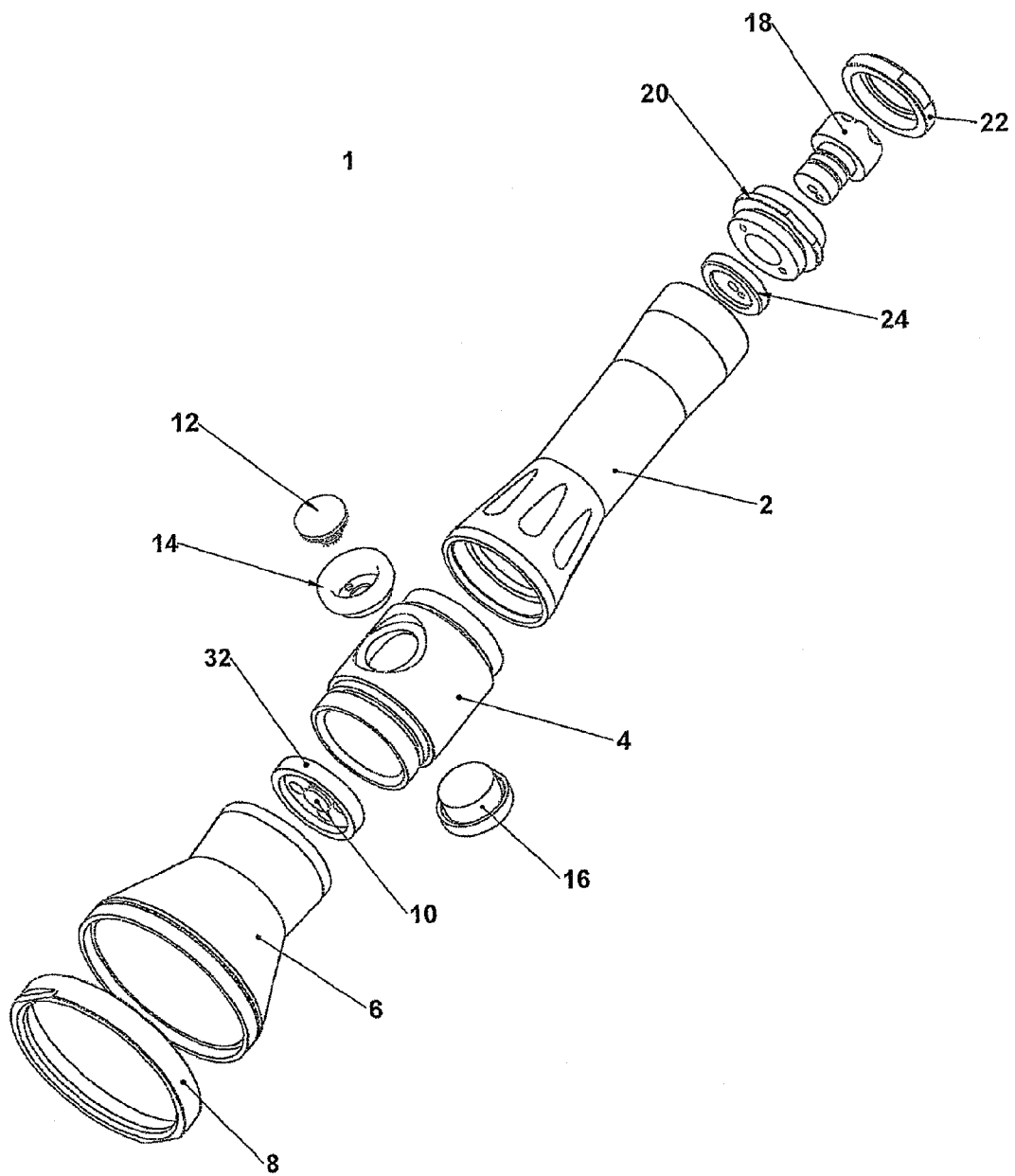
FIG. 1 shows an exploded view of a lighting device (flashlight) which is an embodiment of the invention.

FIG. 1 illustrates the flashlight 1 that is a lighting device according to an embodiment of the invention. The flashlight 1 has a battery body made of e.g. aluminium for holding a battery which is the power force of the flashlight 1. At one end of the battery body 2, a control unit 4 is attached, e.g. by screw fittings, between the battery body 2 and a reflector 6. An LED 10 is mounted on a light source module which attaches to the end of the control unit 4 facing the reflector 6. A transparent lens cover is attached to the front face of the reflector 6 by a lens ring 8.

To operate the control unit 4, a push button 12 is provided in its outer surface, secured by a button collar 14. A tripod bush 16 is built into the control unit 4 to enable the flashlight 1 to be stably mounted, e.g. remotely from a user or an another device, e.g. tripod, firearm etc.

An additional means of operating the flashlight 1 is provided at the far end of the battery housing 2. A tail switch is provided in the form of a push button 18 which is mounted on the battery body 2 via a locking ring 22. The push button 18 acts through a tail bush 20 onto a spring disk 24. The tail bush 20 is arranged to detect when the push button is pressed in a conventional way.

Figure 2:
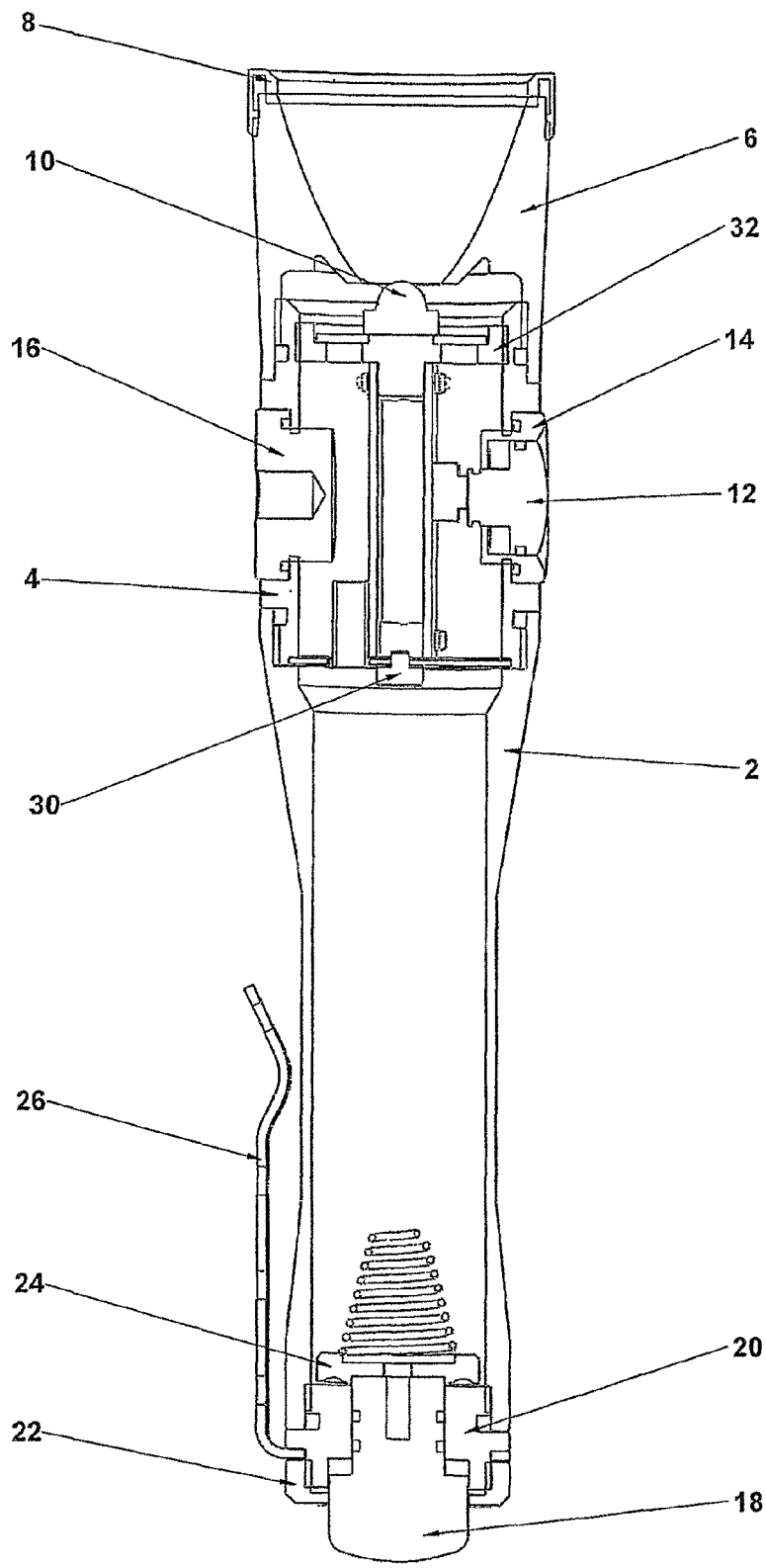
FIG. 2 shows a transverse cross sectional view of the flashlight shown in FIG. 1.

FIG. 2 shows a cross sectional view of the flashlight 1 when assembled. Features in common with FIG. 1 have the same reference numbers and are not described again. FIG. 2 shows that the battery body 2 also includes a bolt clip 26.

The flashlight shown in FIGS. 1 and 2 is formed from a number of modular components, which may be interchanged according to a user's requirements. The basic building block is the control unit 4, which is arranged to configure the remaining modules. The programming and functions of the control unit 4 are discussed in detail below. Around the control unit 4, various interchangeable reflectors 6, battery housings 2, light sources 10 and switch units 18 can be assembled.

For example, reflector units with different beam characteristics can be attached to the control unit. Each reflector unit includes the reflector 9 itself, with means for attaching it to the control unit 4, together with the lens and lens ring. In one type of module, the reflector 9 is slidable along the axis of the flashlight as is conventional e.g. to focus the light from the light source or to vary the light beam coherence. This allows the reflector unit to be 'tuned' to different types of light source.

The light source 10 itself is a separate module, which allows it to be replaced easily by the user in the event of a failure or upgrade. Different light emitters can be provided on different light source modules, e.g. LEDs, filament bulbs, etc. The modular structure allows any light source that can be powered from a constant current of below 1200 mA to be used in a light source module. Thus, a range of modules using LEDs of different power ratings can be provided, which could be bought separately and installed by the end user as optional upgrade(s).

The battery body 2 is another interchangeable module. Different sized battery housing may be provided e.g. to fit different battery sizes. The tail switch 18 can be changed to allow other switching options e.g. remote control. The tail switch button 18 includes a physical battery disconnect switch to allow the user to "lock out" the controls to prevent accidental turn on. This is achieved by provided a quarter turn locking mechanism, whereby turning the tail switch button 18 through 90° prevents it from being pressed.

Figure 3A:
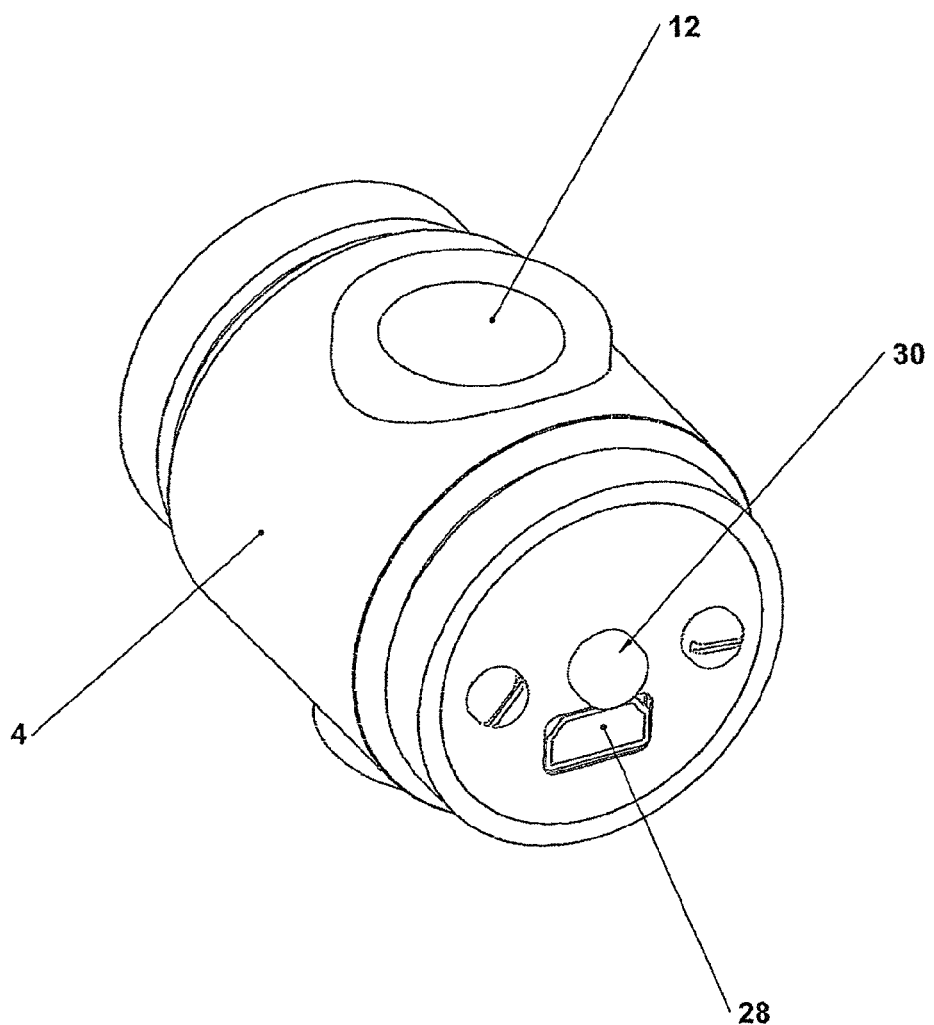
FIGS. 3a and 3b show two perspective views of the control unit of the torch shown in FIG. 1.
Figure 3B:
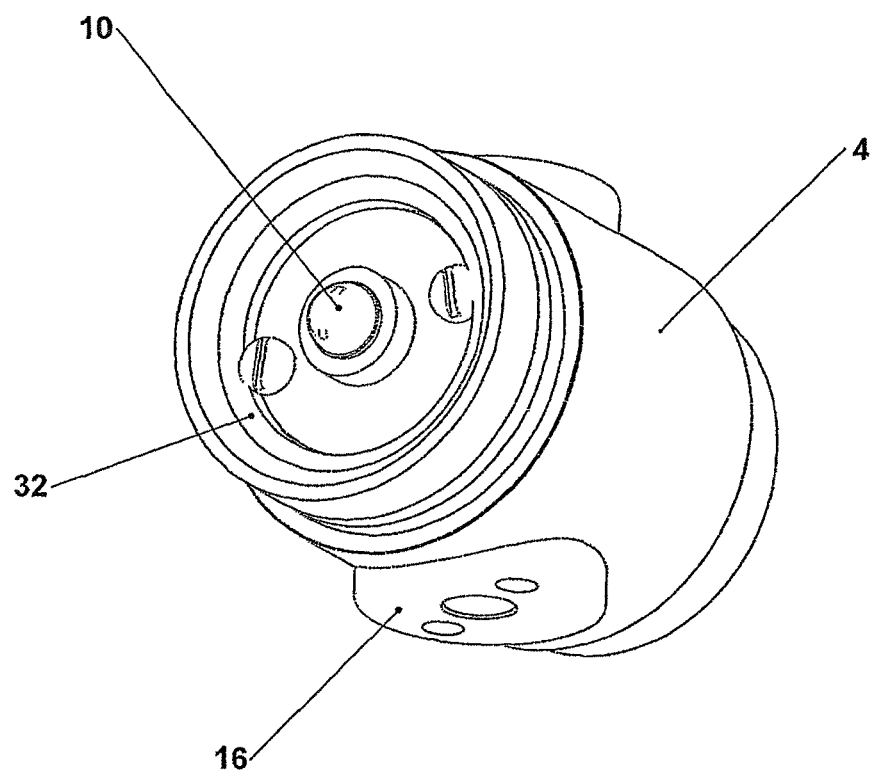

FIGS. 3a and 3b show the control unit 4 in more detail. FIG. 3a shows the end of the control unit 4 facing the battery housing. This end includes an electric contact 30 for contacting a battery terminal and a USB port for connecting the control unit 4 to a computer in order to download control information for the flashlight. This is described in more detail below. FIG. 3b shows the other end of the control unit 4, which has the light source module 32 (incorporating the LED 10) attached to it.

The control unit 4 is the main module of the flashlight 1. It includes a microcontroller for operating the device, and contains all of the electronic circuitry required by the device. There are three sections to the circuit. The first is the circuitry associated with the USB port 28. This provides a means by which the microcontroller and the computer for programming the device can communicate. The second section is the microcontroller and its support circuitry. The third section is the power supply for the light source module 32. This is controlled continuously by a DAC in the microcontroller. The power supply uses a boost converter topology with the load between the output and the positive supply rail, allowing the load to be supplied with anything from 0V to well over the supply voltage. A current sense resistor is employed with an amplifier and feedback loop to provide a constant current output that can be varied continuously between 0 and 1200 mA. The circuit protects against output short circuit by being current limited to 1200 mA. The circuit is also protected from the usual problem of high output voltages being produced in the event of an open circuit, associated with a constant current power supply. This is achieved by limiting the maximum output voltage.

The control unit 4 is arranged to maintain a set current output from the power supply irrespective of the power supply's (batteries) actual input voltage. This allows the device to be powered from a diverse variety of power sources including many different types of battery, both rechargeable and non-rechargeable, the USB interface and a car adaptor.

FIGS. 4 to 9 illustrate the graphical user interface (GUI) provided by a computer program product according to another embodiment of the invention which permits the user to program the configuration of the control unit 4 and hence the flashlight 1. The USB interface described above provides a physical medium, over which communications between the computer and control unit 4 takes place. The programming itself is enabled by embedded software present on the device, which interprets and implements operation instructions created on and downloaded from the computer using the GUI.

Figure 4:
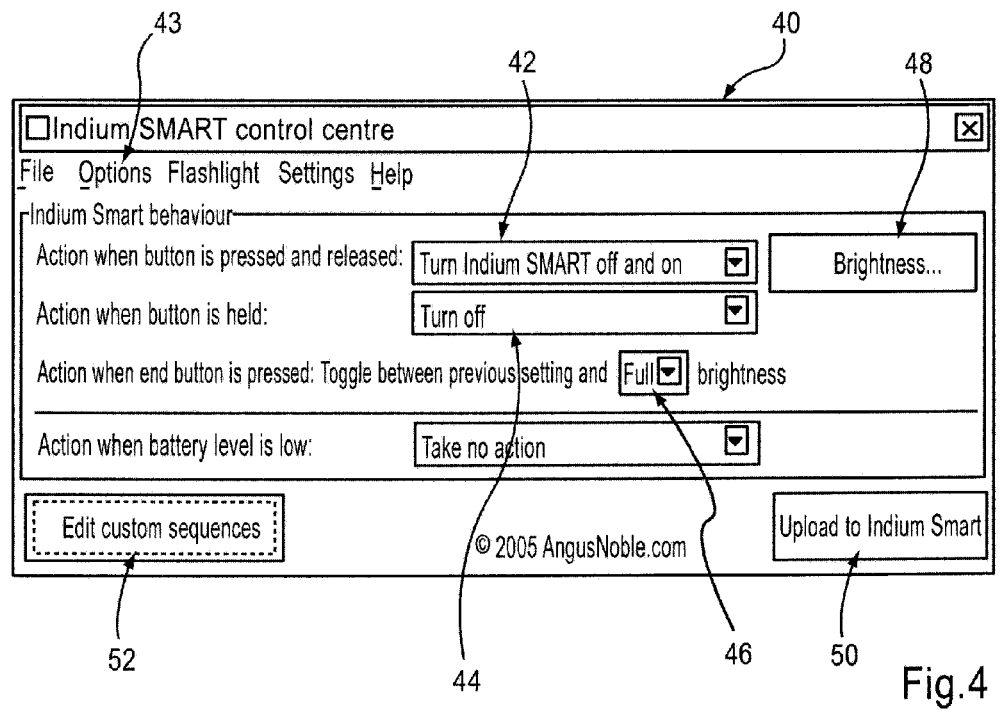
FIG. 4 shows the main menu screen of a graphical user interface created by a computer program product that is another embodiment of the invention.

FIG. 4 shows the main menu screen 40 provided when the computer program is started. The main menu screen 40 presents a number of options to the user. There are three drop-down lists in the middle of the window, which configure the main behavioural options of the flashlight 1. The first drop-down list 42 enables the user to select the action caused by pressing and releasing the push button 12 on the control unit 4. The second drop-down list 44 enables the user to select the action caused by holding down the push button 12. The user may set the length of time the push button must be held down to qualify as a 'hold' rather than a 'press and release' through an item in the "Options" menu. The third drop-down list 46 enables the user to select the action caused pressing the tail switch button 18. In the embodiment shown, the tail switch 18 has a toggle effect, in that it switches the flashlight from whatever it is doing (e.g. off, flashing, etc.) to the brightness selected in list 46 when the tail switch button 18 is pressed and then back again when the button 18 is pressed again. Menu 46 offers the options: Full, Half, Low, Off, and Custom, where the user is able to select brightness either as a percentage value of the full brightness level, or by using a number between 0 (off) and 127 (full brightness).

The first menu 42, which determines the behaviour of the device when the control unit's button 12 is pressed and released offers the options: Turn the device on or off, and Cycle through user sequences. Thus, the user can select between having the device simply turn on or off to a specific brightness level, or having the device cycle through a particular subset of user-created sequences and turn off once the last sequence has been reached when the push button 12 is pressed and released. The button 48 to the right of the drop-down list enables the user to select more detailed options for the selected behaviour. As shown in FIG. 1, the button 48 permits the user to select the brightness level that the device switches on to. As before, the user is able to select brightness either as a percentage value of the full brightness level, or by using a number between 0 (off) and 127 (full brightness). When the 'Cycle through user sequences' option makes use of the user-customised lighting sequences described in detail below. In this context, a 'sequence' is a particular arrangement of the basic configuration blocks for the flashlight, e.g. the output level, pausing, fading between two output levels or repeated blocks. An example of a very basic sequence is setting the output (brightness) level at 75%, then pausing (zero output) for 5 seconds, and then repeating from the start. A more advanced sequence could consist of a fade up to 100% over 2 seconds, then three 0.2 second long flashes of 50% brightness with a 0.5 second delay in between, and then a fade from 100% down to 0% over 1 second. The computer program product allows the user to program such sequences, and save them as files on the computer. One or more of these created sequences can be chosen when the 'Cycle through user sequences' option is selected, so that when the push button 12 on the control unit 4 is pressed, the flashlight 1 is configured to produce light output according to the sequences in that chosen order. The button 52 on the main menu screen 40 allows the user to go to the custom sequence editor screen (shown in FIG. 6).

Figure 5:
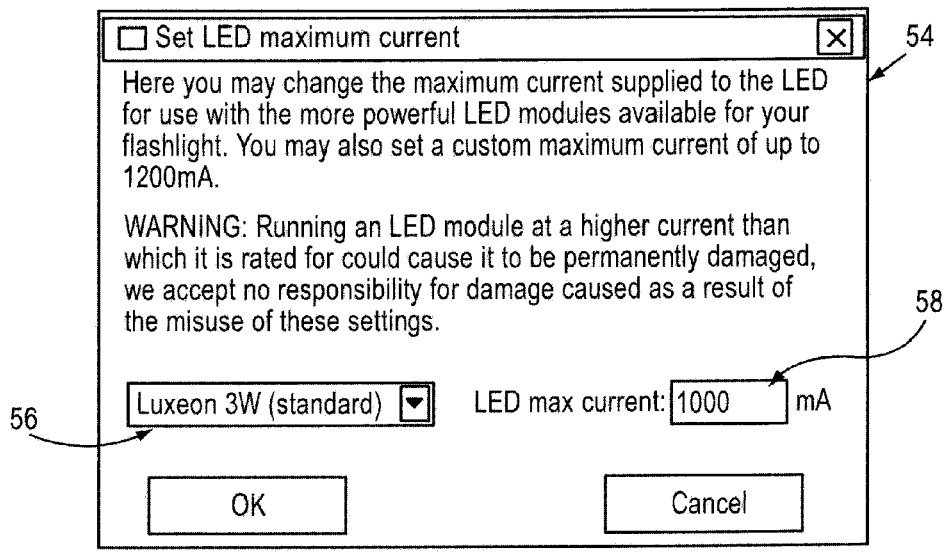
FIG. 5 shows a screen for setting the maximum LED current in the graphical user interface illustrated in FIG. 4.

The "Options" menu item 43 also enables the user set the maximum current that the control unit 4 will permit to be supplied to the light source 10. FIG. 5 shows a screen 54 for setting the maximum current. The current level may be selected by choosing a light emitter type (e.g. a LED type) from the drop-down list 56, in which case the manufacturer's recommended maximum current may automatically be displayed in the current value box 58. Alternatively, the user may customise the flashlight 1 by entering his own chosen value directly into box 58.

The second menu 44, which determines the behaviour of the device when the control unit's button 12 is held down offers the options: Turn off, Jump to certain user sequence, Fade to chosen brightness, Temporarily change to chosen brightness, and Temporarily change to chosen sequence. The user is prompted to choose a brightness or sequence for the latter two options. Thus, when the push button 12 is held, the flashlight may turn off, permanently jump to a certain user sequence, fade up and down between full and zero brightness until the button is released where it will maintain the level of brightness at which the button was released, temporarily change to a certain (customisable) brightness level while the button is held, or temporarily change to a certain user sequence while the button is held. A subsequent button press will return the device to the sequence it was running prior to the button hold. This last behaviour allows the end user to quickly access a brightness level that they have not explicitly chosen as part of a sequence. The temporary options mean that the control unit 4 will be arranged to revert to whatever its previous behaviour was when the push button 12 is released from holding.

Finally, the main menu screen 40 includes an upload button 50 which causes the computer program to download the selected information to the control unit 4 via an USB connection between the control unit 4 and the computer.

Figure 6:
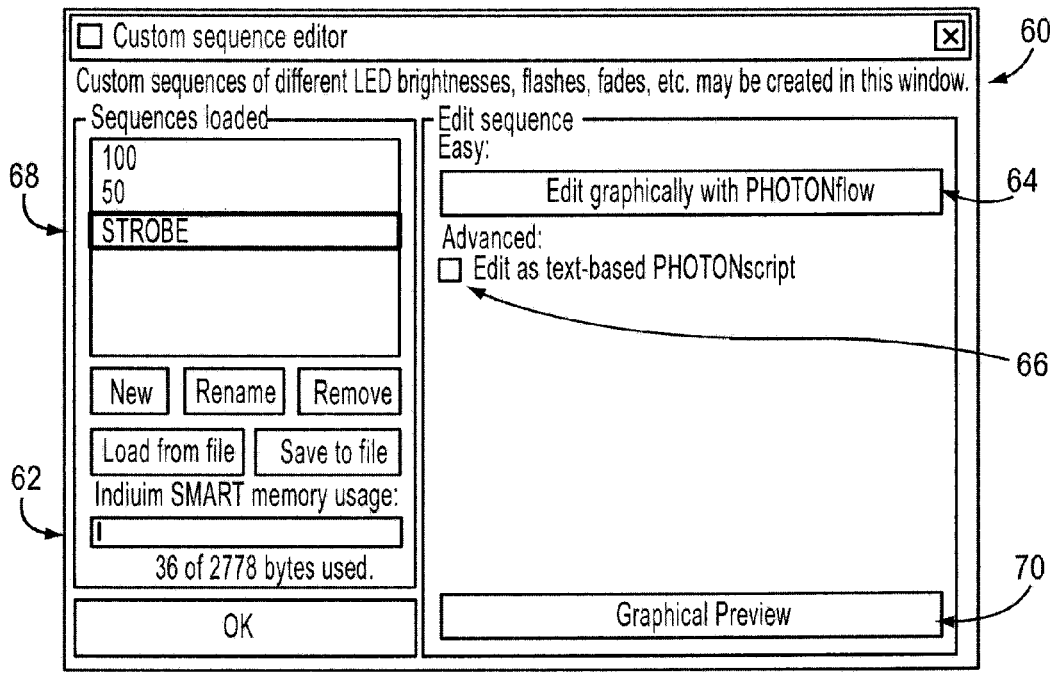
FIG. 6 shows a screen for creating sequences of light outputs in the graphical user interface illustrated in FIG. 4.

Turning to FIG. 6, sequences can be created by the user in two ways using the computer program. The first is to use the graphical sequence editor shown in FIG. 7. The second is to enter commands directly in a text-based scripting language. Both ways support the automatic generation of Morse code from text strings (see below).

FIG. 6 shows the basic sequence editor screen 60 which can be accessed by pressing the edit sequence button 52 on the main menu screen 40. The graphical editor screen (shown in FIG. 7) is accessed by selecting button 64, whereas the text-based editor screen is accessed by selecting box 66. Each sequence created by the user is given a name (defined by the user), which appears in the list 68 when the sequence is saved. The user chooses from this list when he selects the 'Cycle through user sequences' option from drop-down list 42.

Figure 7:
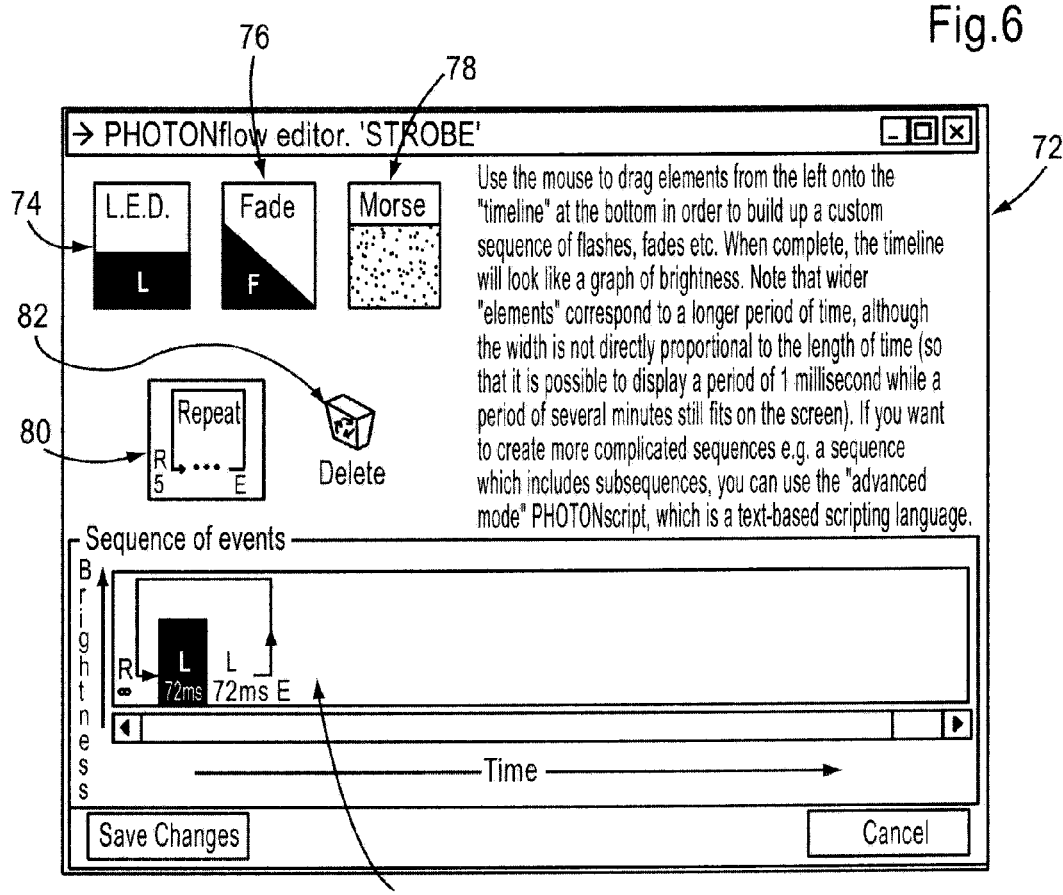
FIG. 7 shows a screen allowing the graphical "drag and drop" creation of sequences.

FIG. 7 shows the graphical editor screen 72. Here a graph 84 of brightness (intensity) against time is presented. Icons 74,76,78,80 representing the various configuration options available to the user may be "dragged and dropped" into the graph 84 to create the different elements of the sequence. Their position in and length along the time line represents when and for how long in the sequence they occur. Their output brightness levels are represented by the vertical height of an intensity indicator on the block. The blocks can then be dragged to rearrange their order or dropped on the rubbish bin 82 to delete them. When a block in the sequence is selected, its parameters (brightness, duration, etc.) appear in the top right corner of the graphical editor screen 72, where they can be altered by the user.

In detail, icon 74 represents the LED output properties. The user may select the brightness and duration of the output. Icon 76 represents a fade (brightening or dimming of the LED). The user may select starting brightness, ending brightness and fade duration. A computer simulated preview of the fade is given. Icon 78 programs in a sequence of short and long flashes representing a text string (entered by the user) in Morse code. Icon 80 is a repeat loop. The icon has two parts, the start icon (R) and end icon (E). The user can insert one or more other icons (including sub-repeats) in between the start and end icons. The inserted sequence icons are then repeated. The number of repeats may be selected by the user.

Figure 8:
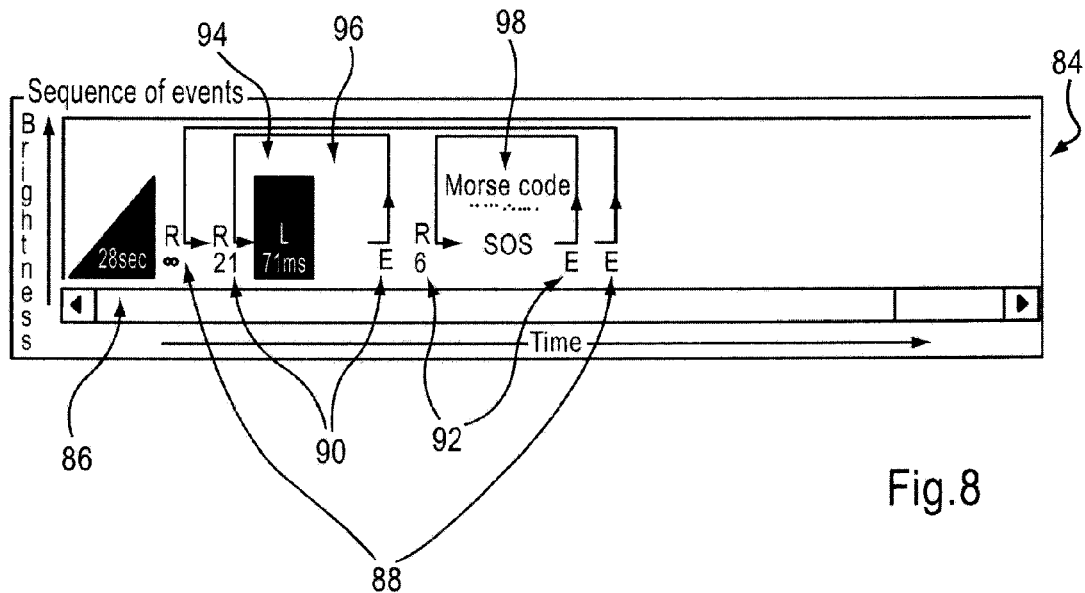
FIG. 8 shows a graphically represented sequence.

FIG. 8 shows an example of a sequence created using the graphical editor. The graph 84 shows the sequence begins with a fade block 86 which brightens the light from zero to full output in just over 2 seconds. This is followed by a repeat loop 88 which repeats endlessly two sub-repeat loops 90,92. The first sub-repeat loop 90 is effectively a strobe, where a flash 94 of the light at full output for 72 ms followed by a pause 96 (zero output) for 71 ms is repeated 21 times. The second sub-repeat loop 92 repeats a Morse code output block 98 indicating SOS 6 times.

Alternatively, the user may enter the sequence in a text based language which allows for greater control over the exact code sent to the device.

After a sequence is entered by either of the above methods a graphical preview can be generated on-screen by the computer program by selecting preview button 70. The preview demonstrates what the sequence will look like when it is run on the device. If the device is currently plugged into the computer at the time you will also have the option to preview the sequence on the device itself, although this preview is run at a scaled down brightness (because the driving power is provided through the USB port).

Figure 9:
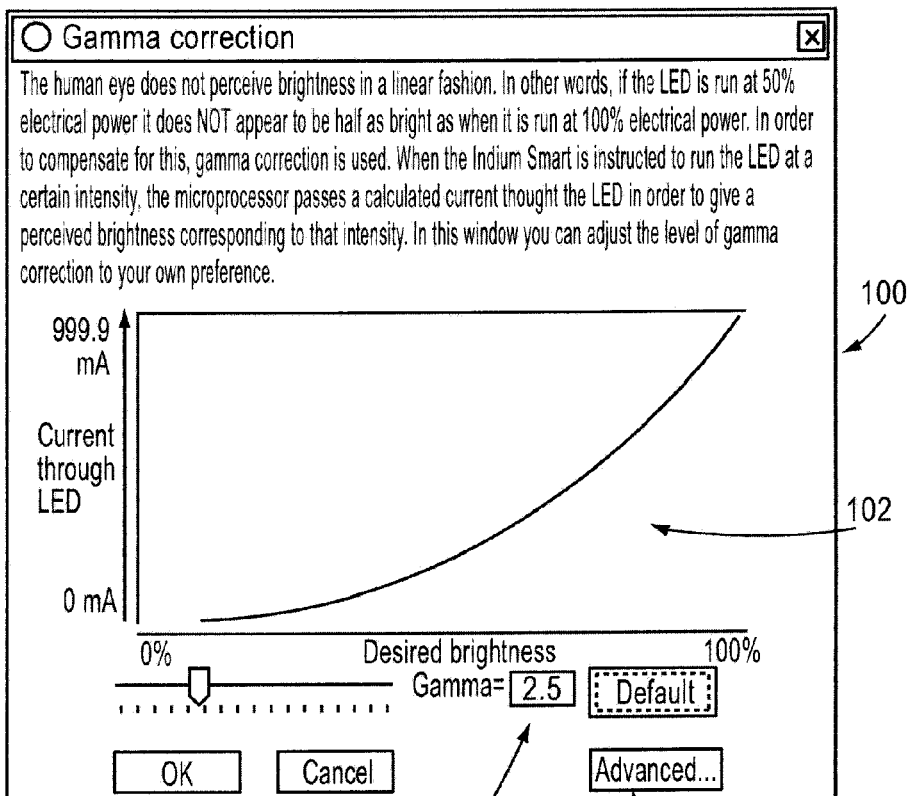
FIG. 9 shows a screen of a graphical user interface that allows the user to alter the gamma correction curve for a lighting device.

Another feature provided by the computer program is the ability to customise the gamma correction curve. FIG. 9 shows a gamma correction screen 100 accessible from the "Options" menu 43 on the main menu screen 40. There are two ways in which the gamma correction curve can be customised. An advanced method (accessible via button 106), which offers the most flexibility, allows the user to load a table of gamma correction values directly from a file. More simply, the software allows the user to set the gamma correction to a power law relationship (as is standard for gamma correction) by setting a value for the index in box 104. This allows the end user to easily tweak the gamma correction relationship. There is an on-screen preview 102 of the relationship in the form of a graph of output power against perceived intensity.

When the user is happy with the choices made in the computer program, they can select the upload button 50 on the main menu screen 40. The software will then search for connected device(s) and, if one is found, the computer program will assemble all of the chosen options into a table of values which is used by the firmware (embedded software in the control unit 4). The user sequences are compiled directly into byte-code for the microcontroller in the control unit 4. This technique saves memory space and increases running speed. The table of values and the sequence byte-code is then concatenated to the firmware code which is stored in a separate file in the software distribution in byte-code form. This code is then downloaded onto the microcontroller by a bootloader, resident in the microcontroller itself e.g. in Intel HEX16 format. The interface between the bootloader on the chip and the computer is a simple ASCII serial protocol. This allows the firmware to be updated to a newer version simply by having the user download a new firmware file e.g. from the internet.

The embedded software in the control unit 4 is essentially divided into two independent components: the bootloader and the firmware. The bootloader is usually unchangeable and allows the computer to download new firmware to the microcontroller and perform a few other interfacing operations between the computer and device. On the other hand, the firmware can be changed and updated at any time by the bootloader and computer program. The firmware contains the code which implements the functions whose parameters are defined by the sequences. The sequences therefore represent one or more configuration blocks whose values, interpreted by the firmware, are used to control the device when it is not connected to the computer, i.e. it implements all of the options and button actions, etc.

The bootloader is the first code to run on the microcontroller and first checks if it is connected to an external device, e.g. computer. If no external device is detected, then the bootloader attempts to transfer control to the firmware. If there is no valid firmware in memory then it simply halts execution. If the device is connected to an external device, then the bootloader will enter a loop waiting for the computer to issue it a command. The computer can issue commands to transfer over the firmware, sequence and option table data and write it to the internal memory or commands which call functions from the firmware (if present and valid) to set the output and all of the other functions used in a sequence. This is used for previewing the sequences on the device from the computer.

The firmware has two main functions, the first is to implement all the functions needed by the sequences, e.g. setting the raw value of the output power, setting the output power with gamma correction, pausing for a certain length of time and fading between two brightness level at a variable speed. The second function is to take control from the bootloader if the device is not connected to the PC and provide the user interface for the torch, i.e. responding to button presses and holds with the user selected actions, running sequences and interfacing to the power supply circuitry.

The invention claimed is:

1. A lighting system having:
    a lighting device for providing light, the lighting device having:
        a light source, wherein the light source is modular and interchangeable with another light source,
        a power supply for providing electric current to the light source, wherein the power supply is modular and interchangeable with another power supply, and
        a control unit for controlling operation of the lighting device, wherein the control unit is modular and interchangeable with another control unit; and
    a programming device remote from the lighting device and communicable with the control unit, the programming device having:
        a computer program loaded thereon that is arranged:
            to receive commands from a user;
            to create one or more operation instructions on the basis of the received commands; and
            to communicate the created operation instruction(s) to the control unit;
    wherein the control unit has a memory for storing the communicated operation instruction(s) and activation means for causing the control unit to execute a stored operation instruction, each operation instruction being arranged to configure one or more operating conditions for the lighting device, the lighting device is a flashlight, and wherein the flashlight includes a USB input wherein the control unit is separate from the programming device and the programming device does not actuate the activation of the operation instructions.

2. A lighting system according to claim 1, wherein the commands from the user correspond to one or more values for operating conditions of the lighting device in the programming device, and the computer program is arranged to collate the value or values into an operating instruction for downloading on to the control unit memory.

3. A lighting system according to claim 1, wherein the lighting device is portable and separable from the programming device.

4. The lighting system of claim 1, wherein the power supply uses a boost converter topology with a load between an output and a positive supply rail.

5. The lighting system of claim 1, wherein the power supply includes a resistor with an amplifier and a feedback loop to provide a constant current output that can be varied continuously between 0 and 1200 mA.

6. The lighting system of claim 5, wherein the resistor, amplifier, and feedback loop provide for a current limitation of 1200 mA to prevent short circuits.

7. The lighting system of claim 1, wherein the control unit includes a USB input, and the USB input is not accessible from outside of the flashlight when the flashlight is closed.

8. The lighting device of claim 1, wherein the control unit includes circuitry for receiving power from a plurality of power supplies, the plurality of power sources including a battery, a USB interface, and a car adapter, the power supply being a supply of the plurality of power supplies.

9. A lighting device having:
    a light source, wherein the lighting device is a flashlight, wherein the light source is modular and interchangeable with another light source;
    a power supply for providing electric current to the light source, wherein the power supply is modular and interchangeable with another power supply; and
    a control unit for controlling operating of the light device, the control unit being communicable with an external device in order to receive a plurality of operation instructions from the external device, each of the plurality of operation instructions configured to be triggered via a sequence of button pushes unique to an operation of the plurality of operation instructions, wherein the button receiving the button pushes is located on the flashlight;
    wherein the control unit is arranged to store the received operation instruction(s) and to execute a stored operation instruction upon receipt of a user command, each operation instruction being arranged to configure operating conditions for the lighting device wherein the lighting device is a flashlight and the flashlight includes a USB input, wherein the control unit is modular and interchangeable with another control unit.

10. A lighting device according to claim 9, wherein the light source comprises one or more LEDs.

11. A lighting device according to claim 9, wherein the control unit includes electronic circuitry for operating the device and a communication interface for receiving the plurality operating instructions from the external processing device.

12. A lighting device according to claim 11, wherein the communication interface includes a USB port and associated circuitry.

13. A lighting device according to claim 9, wherein the control unit includes processing means arranged to configure operation of the lighting device on the basis of operating instructions received from the external processing device.

14. A lighting device according to claim 9, having a tail switch located on an end of the flashlight body opposite the light source and arranged to send a signal to the control unit if it is actuated, whereby the control unit is arranged to configure the lighting device according to a customizable operating instruction.

15. A lighting device according to claim 14, wherein the tail switch is arranged to momentarily disconnect the power supply when actuated.

16. A lighting system comprising:
a flashlight, including a light source, a power supply, and a control unit;
the power supply for providing electric current to the light source, wherein the power supply is continuously controlled by a DAC in the microcontroller; and
the control unit for controlling operation of the lighting device, wherein the control unit includes a USB input, wherein the light source is modular and interchangeable with another light source, the power supply is modular and interchangeable with another power supply, and the control unit is modular and interchangeable with another control unit.

17. The lighting system of claim 16, wherein the power supply uses a boost converter topology with a load between an output and a positive supply rail.

18. The lighting system of claim 16, wherein the power supply includes a resistor with an amplifier and a feedback loop to provide a constant current output that can be varied continuously between 0 and 1200 mA.

19. The lighting system of claim 18, wherein the resistor, amplifier, and feedback loop provide for a current limitation of 1200 mA to prevent short circuits.

20. A flashlight comprising:
a flashlight body;
a light source located in the flashlight body; and
a control unit for controlling operation of the flashlight, wherein the control unit includes circuitry for receiving power from a plurality of power sources, the plurality of power sources including a battery, a USB interface, and a car adapter, wherein the control unit is separate from a programming device that provides operation instructions to the control unit and the control unit actuates the operation instructions separately from the programming device.

21. The flashlight of claim 20, wherein the flashlight includes a USB input.

22. The lighting system of claim 20, wherein the power supply uses a boost converter topology with a load between an output and a positive supply rail.

23. The lighting system of claim 20, wherein the power supply includes a resistor with an amplifier and a feedback loop to provide a constant current output that can be varied continuously between 0 and 1200 mA.

24. The lighting system of claim 23, wherein the resistor, amplifier, and feedback loop provide for a current limitation of 1200 mA to prevent short circuits.

* * * * *